United States Patent

Reeves et al.

[15] 3,688,177
[45] Aug. 29, 1972

[54] BATTERY CHARGER

[72] Inventors: John B. Reeves, Trafford; Gary O. Hitchins, Irwin, both of Pa.

[73] Assignee: Westinghouse Electric Corporation, Pittsburgh, Pa.

[22] Filed: March 25, 1971

[21] Appl. No.: 127,875

[52] U.S. Cl. ..................320/24, 320/39, 320/11
[51] Int. Cl. ...................................H02j 7/02
[58] Field of Search ...............320/22–24, 31–33, 320/39, 40

[56] References Cited

UNITED STATES PATENTS

| | | |
|---|---|---|
| 3,412,308 | 11/1968 | Brown..........................320/24 |
| 3,421,066 | 1/1969 | Flynn et al. ..............320/23 X |
| 3,351,838 | 11/1967 | Hunter.....................320/32 X |
| 3,517,295 | 6/1970 | Lapuyade.................320/23 X |
| 3,382,425 | 5/1968 | Legatti .........................320/32 |

Primary Examiner—J. D. Miller
Assistant Examiner—R. J. Hickey
Attorney—A. T. Stratton and F. E. Browder

[57] ABSTRACT

Battery charging apparatus providing different charging rates dependent upon the state of charge of the battery. The battery charging current and battery terminal voltage are sampled and applied to a control circuit. The control circuit changes the conduction duration of a controllable rectifier to change the battery charging current. The control circuit is adaptable to multiple-phase battery charging apparatus.

7 Claims, 4 Drawing Figures

PATENTED AUG 29 1972

WITNESSES:

Bernard R. Gregway

John R. Hitchins

INVENTORS
John R. Reeves &
Gary O. Hitchins.
BY
F. E. Browder
ATTORNEY

3,688,177

BATTERY CHARGER

BACKGROUND OF THE INVENTION

1. Field of the Invention

This invention relates in general to battery charging apparatus, and more particularly to battery charging apparatus which regulates the charging current by regulating the firing angle of a controllable rectifier.

2. Description of the Prior Art

In charging a battery it is desirable to provide a charging current which has a magnitude sufficient to charge the battery within a reasonable time. The charging current must not be too large or the battery plates may become distorted and permanent battery damage will result. It is possible to charge a battery at a constant current value; however, the prior art has proven that increasing the charging rate during the beginning of the charging operation is not destructive to the battery. The charging rate must be reduced after the battery is partially charged to prevent excessive heat generation within the battery.

It is also advantageous to keep batteries which are used in standby service near full charge at all times. Because storage batteries inherently discharge over a period of time, a charging method which will keep the battery near full charge is desirable. While battery chargers are available which give these results, a battery charger having more economical and reliable control circuits which are adaptable to various battery voltages and capacities is desirable.

SUMMARY OF THE INVENTION

The battery charger of this invention provides a new and improved method for controlling the battery charging current. The control circuit is constructed of small and economical solid state elements and is capable of controlling a wide range of battery charging currents and voltages with relatively simple circuit component adjustments.

The battery charger of this invention allows the charging current to maintain a maximum value established by the circuit components until the battery is partially charged. The charging current is then reduced to an intermediate value until the fully charged condition is reached. The current then reduces to a "trickle charge" current or no current at all. The battery charger will be reactivated to charge the battery again if it becomes discharged. This sequence is accomplished automatically by the circuits of this invention. The simplicity of the circuit producing this relatively complicated sequence makes it adaptable to multiple-phase battery chargers. Each phase is controlled separately from a common voltage reference.

BRIEF DESCRIPTION OF THE DRAWING

Further advantages and uses of this invention will become more apparent when considered in view of the following detailed description and drawing in which.

DESCRIPTION OF THE PREFERRED EMBODIMENT

Figure 1:
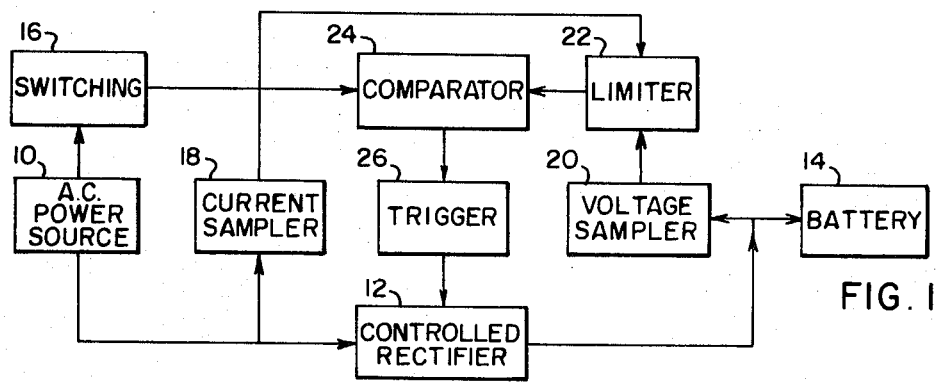
FIG. 1 is a block diagram illustrating the functions of a battery charging circuit constructed according to this invention.

Throughout the following description similar reference characters refer to similar members in all the figures of the drawing.

Referring now the drawing, and FIG. 1 in particular, there is shown a block diagram of a battery charger which utilizes an embodiment of this invention. The blocks illustrate the functions of the circuits comprising the battery charger and the arrows indicate, generally, the direction of power or signal flow.

Block 10 represents a source of AC power which has outputs leading to a switching circuit and a rectifying circuit represented by blocks 16 and 12 respectively. The rectifying circuit 12 is of the controllable type which supplies a variable DC output voltage dependent upon the length of time during the AC voltage cycle the rectifier functions. The DC voltage from the controlled rectifier 12 is applied to a battery 14 for the purpose of increasing the stored electrical energy of the battery.

The switching circuit 16 responds to the voltage applied to it from the AC power source 10. The output of the switching circuit is dependent upon the polarity of the voltage applied to the switching circuit 16 by the power source 10. The information conveyed by the output signal of the switching circuit 10 is applied to a comparator 24. If the voltage applied to the switching circuit 16 has the proper polarity, the information conveyed tends to activate the comparator 24. If the polarity of the voltage applied to the switching circuit 16 is not properly polarized, the information conveyed prohibits activation of the comparator 24. When the comparator is activated, a trigger circuit 26 functions and the controlled rectifier 12 conducts.

The activation of the comparator is regulated by a limiter circuit 22. Even though the information from the switching circuit calls for rectifier conduction, the information from the limiter may prevent or reduce the time of activation of the comparator. The limiter 22 is controlled by signals from a current sampler 18 and a voltage sampler 20. The current sampler measures a current proportional to the battery charging current while the voltage sampler 20 measures the voltage of the battery 14. The current limiting feature of the battery charger establishes a maximum charging current regardless of the state of battery charge. The battery charger functions at this maximum current only when the battery is relatively uncharged. The voltage limiting feature prevents an excessive voltage from being applied to the battery. The voltage sampler 20 is effectively a means for measuring the amount of battery charge.

Assuming that the battery 14 is relatively uncharged, the battery charger will supply the maximum charging current as regulated by the current limiting feature. As the charge of the battery 14 increases, its terminal voltage will similarly increase. The voltage sampler 20 responds after a predetermined battery voltage is reached. The response limits the activation of the comparator 24 and effectively reduces the charging current to an intermediate value. When the battery is substantially fully charged, the battery terminal voltage is such that the voltage sampler and limiter circuits prevent activation of the comparator circuit 24 and effectively turns off the battery charger. If the charge of the battery 14 is reduced the battery terminal voltage will drop. If the battery terminal voltage drops to a predetermined level, the comparator 24 will be activated and charging current will flow through the battery. When the charge of the battery is increased to a predetermined value, the charger will again be effectively turned off. This repeating charging cycle maintains the battery at a relatively fully charged condition. The circuitry may also be modified to produce a low level current or "trickle charge" instead of turning off the battery charger.

Figure 2:
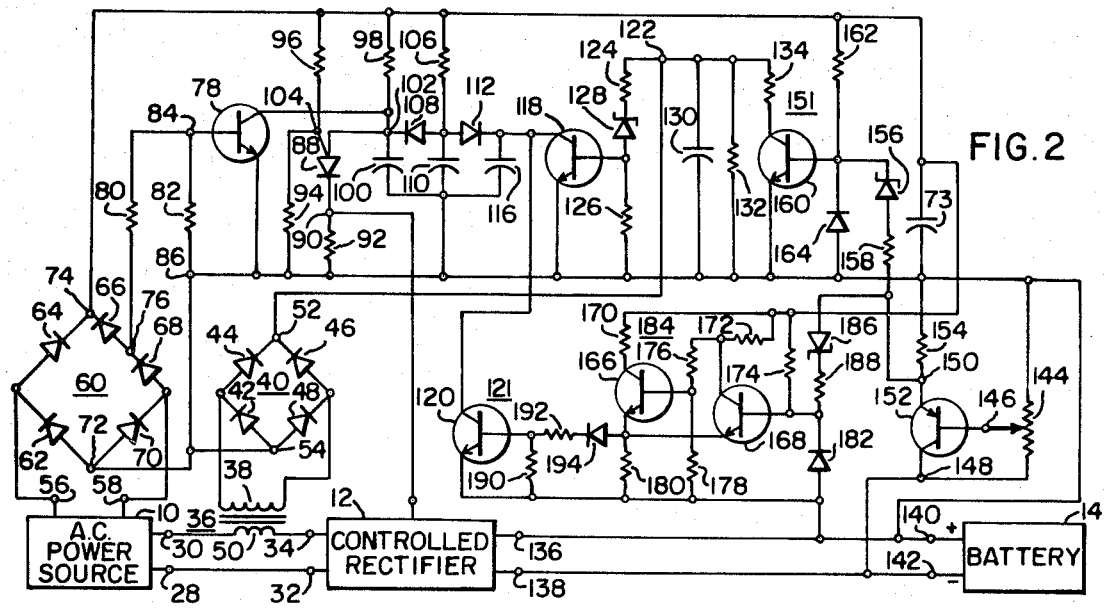
FIG. 2 is a schematic circuit diagram of a single phase battery charger constructed according to this invention.

FIG. 2 illustrates circuit arrangements which may be used for the control and power circuits of the battery charger. The AC power source 10 may comprise any means of supplying an AC voltage having adequate current capabilities, such as a transformer or AC generator. The controlled rectifier 12 comprises silicon controlled rectifiers and diodes or other controllable rectifying means.

The output terminal 28 of the AC power source is connected to the input terminal 32 of the controlled rectifier 12. A current transformer 36 is connected between the source terminal 30 and the rectifier terminal 34. The secondary winding 38 of the current transformer is connected to a bridge rectifier circuit 40 comprising diodes 42, 44, 46 and 48. Assuming that the load on the bridge rectifier 40 is constant, the DC output voltage of the bridge rectifier 40 is proportional to the AC voltage of the secondary winding 38. The voltage of the secondary winding 38 is proportional to the current flowing in the primary winding 50, hence the DC voltage between terminals 52 and 54 is proportional to the AC current flowing into the controlled rectifier 12. The AC current delivered to a rectifying circuit varies directly with the DC output current of the rectifying circuit, thus the voltage between terminals 52 and 54 is proportional to the magnitude of the DC current leaving the controlled rectifier 12. Since negligible current flows into the control circuit from the controlled rectifier, the output current of the controlled rectifier 12 is substantially equal to the battery charging current.

Output terminals 56 and 58 of the AC power source 10 are connected to a modified bridge rectifier circuit 60 comprising diodes 62, 64, 66, 68 and 70. The DC voltage between terminals 72 and 74 is relatively constant and free of AC components due to the smoothing action of the capacitor 73. However, the DC voltage between points 76 and 72 is half-wave rectified and pulsating. The terminals 56 and 58 supply a voltage to the bridge rectifier circuit 60 which is phased so that when the voltage across the silicon controlled rectifier element of the rectifier circuit 12 is poled for conduction, terminal 76 is negative with respect to terminal 72. That is to say, that, the control voltage across diode 68 is 180° out of phase with the power voltage across the controllable rectifying element.

When the voltage at terminal 76 is positive with respect to terminal 72, current flows into the base terminal of transistor 78 through resistor 80 causing the transistor 78 to conduct. A resistance element 82 is connected between terminals 84 and 86 for biasing purposes. The anode of the programmable unijunction transistor 88 is effectively shorted to "ground" potential through transistor 78. This prevents conduction by the programmable unijunction transistor 88, therefore the voltage at terminal 90 is insufficient to fire the controlled rectifier 12. Circuit elements 92, 94 and 96 are resistance elements needed for developing the proper voltages at the terminals of the programmable unijunction transistor 88.

When the voltage across the controllable rectifying element of the controlled rectifier 12 is poled for conduction, the voltage at terminal 76 is substantially zero with respect to terminal 72. This causes transistor 78 to be turned off, thus removing the short around the programmable unijunction transistor 88. Current flows through resistor 98 and charges capacitor 100. The values of the resistors 94, 96 and 98 and the capacitor 100 are such that the voltage of the charging capacitor 100 at terminal 102 does not reach the amplitude of the voltage at terminal 104 of the programmable unijunction transistor 88 during the half cycle interval the current is flowing. Therefore, the charging current from resistor 98 alone is insufficient to cause the programmable unijunction transistor 88 to conduct.

The capacitor 100, along with capacitor 110, is also charged through the diode 108 by current flowing through the resistor 106. Assuming that the conditions are such that no current flows through the diode 112, the capacitors 100 and 110 will be charged in a relatively short time to a voltage sufficient to cause the programmable unijunction transistor 88 to conduct. The value of resistor 106 determines the charging rate under these conditions and effectively determines the maximum control range of the controlled rectifier 12. For example, a value selected for the resistor 106 which permits sufficient charging of the capacitor 100 during 30° of the control voltage wave permits the controlled rectifier 12 to conduct for 150° of the power voltage wave. Thus the controlled rectifier 12 may be programmed to conduct between 0° and 150°.

The charging rate of the capacitors 100 and 110 is reduced when current is caused to flow through diode 112. This current ultimately limits the output of the controlled rectifier 12 and the battery charging current. If capacitor 116 is unaffected by the shunting transistors 118 and 120, the capacitor 116 will be charged to the voltage sufficient to prevent diode 112 from conducting. Unless capacitor 116 is discharged through the shunting transistors 118 and 120, the battery charging current will be high. It is by use of the shunting transistors 118 and 120 that the current and voltage samplers affect changes in the battery charging current.

The maximum current during a battery charging operation usually occurs when the battery is at its lowest state of charge. A current limiting means must usually be employed in a battery charger to prevent excessive battery charging currents and the destructive effects associated therewith. In the battery charger of this invention the maximum current allowed for a particular battery charging operation is regulated by the shunting effect on the capacitor 116 by the transistor 118.

The DC voltage at terminal 52, which is proportional to the charging current, is applied to the circuitry associated with the shunting transistor 118 at terminal 122. Circuit components of the shunting transistor 118 include resistor 124, resistor 126, and Zener diode 128. A capacitor 130 is connected across the current sampler voltage to reduce the AC component of that voltage. As the battery charging current increases, the voltage across the serially connected combination of the resistors 124 and 126 and the Zener diode 128 increases. When the voltage at terminal 122 is high enough to break down the Zener diode 128, the transistor 118 conducts and starts discharging the capacitor 116. Since the charge of the capacitor 116 determines the battery charging current, the action of the Zener diode 128 establishes the maximum battery charging current which can be supplied by this battery charger. By selecting the proper values for the circuit components 124, 126, and 128, a maximum battery charging current can be established which will not be destructive to the battery being charged. Resistors 132 and 134, which exhibit a loading effect on the current sampler voltage at terminal 122, also control the maximum battery charging current. The values of the resistors 132 and 134 also limit the battery charging current available from this battery charger.

The output terminals 136 and 138 of the controlled rectifier 12 are connected to the terminals 140 and 142 of the battery 14 being charged. The battery voltage is sampled by a means such as potentiometer 144 which is electrically connected across the battery terminals. The voltage at terminal 146 of the potentiometer 144 with respect to terminal 148 is proportional to the battery terminal voltage. As the state of charge of the battery 14 increases, its terminal voltage likewise increases. When the battery terminal voltage attains a certain value, predetermined by the setting of the potentiometer 144, the voltage at terminal 150, between transistor 152 and resistor 154, is sufficient to break down the Zener diode 156. A resistor 158 limits the avalanche current. The voltage limiting stage 151, comprising a transistor 160, resistors 162 and 134, and a diode 164, is turned off when the avalanche diode 156 breaks down. The load on the current sampler voltage is reduced causing the voltage at the terminal 122 to increase. An increase in the voltage at terminal 122 decreases the battery charging current. Thus, when the terminal voltage of the battery 14 increases to a predetermined value, the battery charging current will be reduced to an intermediate value.

A Schmitt trigger circuit 184 is formed by transistors 166 and 168, resistors 170, 172, 174, 176, 178 and 180, and a diode 182. The input to the Schmitt trigger circuit 184 is connected to the voltage sampling stage 151 through a Zener diode 186 and a resistor 188. When the battery terminal voltage reaches a value characteristic of a fully charged battery, the voltage developed at terminal 150 is sufficient to break down the Zener diode 186 and fire the Schmitt trigger circuit 184. The output of the Schmitt trigger circuit is coupled into the base circuit of the shunting transistor 120 by resistors 190 and 192 and a diode 194. When the Schmitt trigger circuit 184 fires, the shunting transistor is turned on and capacitor 116 is discharged. As herebefore stated, when the capacitor 116 is completely discharged, no battery charging current will flow. Thus, when the battery 14 reaches the fully charged condition, the charging current is reduced to zero. The values for the components of the Schmitt circuit 184 and the Zener diode 186 are selected to permit the Schmitt circuit to revert to its original state if the battery voltage drops below a predetermined value. Thus, if the battery becomes discharged, the battery charger will charge the battery again.

Figure 3:
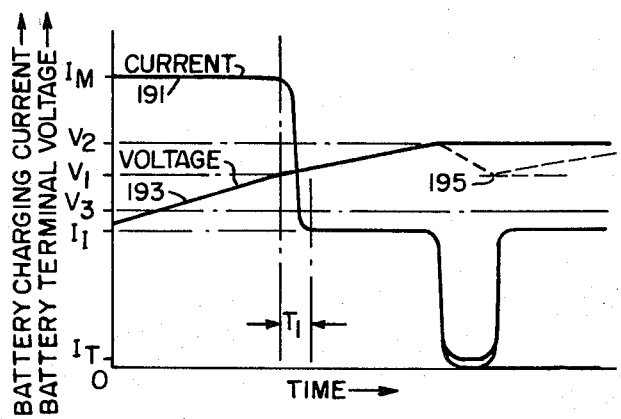
FIG. 3 is a graph showing the relation between the battery charging current and the battery terminal voltage with respect to time of a battery charging circuit constructed according to this invention.

The operation of the battery charger is illustrated by the graph of FIG. 3. The abscissa of the graph represents the time of the charging operation and the ordinate represents the battery terminal voltage and the battery charging current. The solid line 191 represents the relation between the battery charging current and time, while the solid line 193 represents the relation between the battery terminal voltage and time.

If the battery to be charged is relatively uncharged at the beginning of the charging operation, a maximum predetermined current $I_M$ will flow through the battery terminals. After a period of time, the battery terminal voltage will be increased to a predetermined value $V_1$. At this time the battery charging current is reduced to an intermediate value $I_I$. The time interval $T_1$, which is the time required to change from the maximum to the intermediate current, is dependent upon the characteristics of the control circuit components, especially the Zener diodes. When the battery terminal voltage increases to a second predetermined value $V_2$ the battery charging current is reduced to a "trickle charge" current $I_T$ or, alternatively, to zero if the battery charger is so constructed. If the battery terminal voltage then reduces to the value $V_1$ as shown by dotted line 195, the battery charger is recycled and a charging current $I_I$ will flow through the battery as represented by dotted line 197 until voltage $V_2$ is again reached.

Although the circuit shown reduces the charging current to zero, the transistor shunting stage 121 could be modified to only partially discharge the capacitor 116. This would have the effect of maintaining a relatively low charging current to "trickle charge" the battery.

Figure 4:
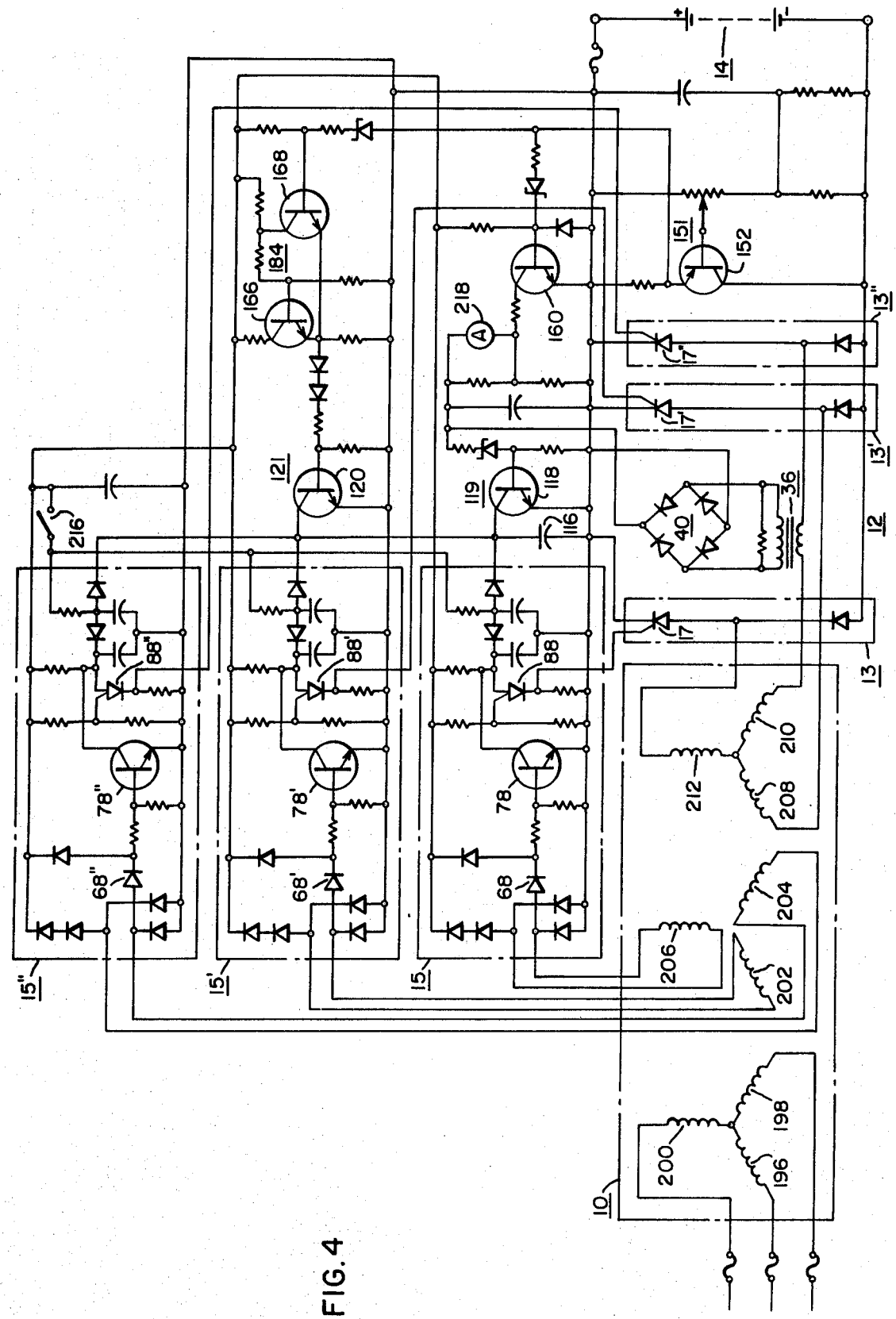
FIG. 4 is a schematic circuit diagram of a three-phase battery charger constructed according to this invention.

The rectifying and controlling circuits shown in FIG. 2 are arranged for use with a single-phase AC power source and rectifier circuit. The basic control circuit described could also be applicable to a battery charger operating from a multiple-phase AC power source. FIG. 4 shows a schematic circuit diagram illustrating how the basic control circuit shown in FIG. 2 may be used for a three-phase operation. The diagram in FIG. 4 includes certain components which are used for component protection and circuit construction convenience. For reasons of clarity these components were not shown in FIG. 2. To facilitate discussion, corresponding functions or elements in each phase circuit have similar reference characters with prime marks to denote different phases.

Referring to FIG. 4 in more detail, the AC power source 10 comprises a three phase transformer having primary windings 196, 198 and 200 which are star connected, secondary control windings 202, 204 and 206 which are not interconnected and secondary power winding 208, 210 and 212 which are star connected.

The star connected windings could be delta connected. The controlled rectifier 12 comprises separate phase rectifiers 13, 13' and 13''. Each phase rectifier comprises a diode and a silicon controlled rectifier connected to provide full wave rectification. Each phase rectifier 13, 13' and 13'' is controlled by a phase control circuit 15, 15' and 15'' respectively. All three control circuits are similarly connected to the capacitor 116 which regulates the amount of conduction per phase. The charge of the capacitor 116 is determined by the associated sampling and limiting circuitry in a manner similar to the single-phase battery charger shown in FIG. 2.

The control windings 202, 204 and 206 are phased so that the control voltages developed across diodes 68, 68' and 68'' are 180° out of phase with the voltages developed across the silicon controlled rectifiers 17, 17' and 17''. Thus, each phase control circuit 15, 15' and 15'' functions independently. Since each phase control circuit is programmed from the same reference, i.e., capacitor 116, the conduction angle for each silicon controlled rectifier is the same for each AC voltage cycle.

A three-phase battery charger constructed according to the circuit diagram shown in FIG. 4 produced the maximum charging current until the battery voltage attained a value of 2.37 volts per cell. The battery charger then switched to the intermediate charging current until the battery voltage attained a value of 2.5 volts per cell. At this voltage, the battery charging current was reduced to zero. When the battery terminal voltage fell to a voltage below 2.1 volts, the charger commenced charging again.

A switch 216 may be used in the charging circuit of the capacitor 116 to activate the battery charger. Thus, a low current rated switch can control a relatively large current battery charger. A meter 218 is shown in the collector circuit of the transistor 160. Since the current flowing through the meter 218 is directly proportional to the current in the primary winding of the current transformer 36, the meter 218 gives an indication of the battery charging current.

We claim:

1. A battery charger comprising controllable rectifying means having input and output terminals, said output terminals being suitable for connection to the battery being charged, means of supplying alternating current to said input terminals of said controllable rectifying means, rectifier controlling means which controls the battery charging current by controlling the condition duration per cycle of said controllable rectifying means, said rectifier controlling means limiting the maximum battery charging current to a first predetermined current value, said rectifier controlling means reducing the battery charging current to a second predetermined current value when the terminal voltage of the battery being charged increases to a first predetermined voltage value, apparatus including a bistable multivibrator in said rectifier controlling means for reducing the battery charging current to a third predetermined current value when the terminal voltage of the battery being charged increases to a second predetermined voltage value, said rectifier controlling means increasing the battery charging current if the terminal voltage of the battery decreases, and current transformer means in said controlling means responsive to said alternating current for controlling the maximum current delivered to said battery.

2. The battery charger of claim 1 wherein the third predetermined current value of battery charging current is equal to zero.

3. The battery charger of claim 1 wherein the rectifier controlling means comprises means for sampling a current proportional to the battery charging current, battery terminal voltage sampling means, battery charging current limiting means, reference voltage means comprising Zener diodes, and rectifier triggering means comprising a programmable unijunction transistor.

4. The rectifier controlling means of claim 3 wherein said bistable multi-vibrator circuit may be triggered to decrease or increase the battery charging current.

5. A battery charger comprising controllable multiple-phase rectifying means having input and output terminals, said output terminals being suitable for connection to the battery being charged, means of supplying multiple phase alternating current to said input terminals of said multiple-phase controllable rectifying means, multiple-phase rectifier controlling means which controls the battery charging current by controlling the conduction duration per cycle of said controllable rectifying means, said rectifier controlling means including current transformer apparatus coupled to one phase of said alternating current supplying means for limiting the maximum battery charging current to a first predetermined current value, said rectifier controlling means reducing the battery charging current to a second predetermined current value when the terminal voltage of the battery being charged increases to a first predetermined voltage value, said rectifier controlling means reducing the battery charging current to a third predetermined current value when the terminal voltage of the battery being charged increases to a second predetermined voltage value, and said rectifier controlling means increasing the battery charging current to said first predetermined current value if the terminal voltage of the battery decreases to a third predetermined voltage value.

6. A battery charger comprising controllable multiple-phase rectifying means having input and output terminals, said output terminals being suitable for connection to the battery being charged, means of supplying multiple-phase AC power to said input terminals of said multiple-phase controllable rectifying means, multiple-phase rectifier controlling means which controls the battery charging current by controlling the conduction duration per cycle for each phase of said controllable rectifying means, said multiple-phase rectifier controlling means comprising means for sampling a current which is proportional to the battery charging current, means for sampling the battery terminal voltage, said current and voltage sampling means being connected to voltage reference means, said voltage reference means producing a response when a predetermined magnitude of voltage is applied thereto, said response being applied to triggering means having an output, said triggering output being controlled by said voltage reference response, and said triggering output controlling said controllable rectifying means.

7. A battery charger comprising a three-phase full wave bridge rectifying circuit having input and output terminals, said three-phase rectifying circuit comprising silicon controlled rectifiers, said output terminals being suitable for connection to the battery being charged, a three-phase AC transformer having two secondary outputs, one of said outputs being connected to said three-phase rectifying circuit, the other of said secondary outputs having each phase thereof connected independently to a single-phase rectifier circuit, a control circuit which controls the battery charging current by controlling the conduction duration per cycle of said three-phase rectifying circuit, said control circuit comprising a current sampler having a current transformer and rectifier circuit, said current sampler producing a DC voltage proportional to the AC current in one phase of said three-phase transformer output which is connected to said three-phase rectifying circuit, a battery terminal voltage sampler, the output of said voltage sampler and said current sampler being connected to a limiting circuit comprising avalanche diodes and transistors, a rectifier trigger circuit comprising three programmable unijunction transistors, each of said programmable unijunction transistors having its gate electrode controlled in common by said limiting circuit.

* * * * *